/ 149

Patented Feb. 25, 1936

2,031,895

UNITED STATES PATENT OFFICE 2,031,895

CARBOXYLIC ACID DERIVATIVES OF SULPHURIZED CINCHONA BARK ALKALOIDS

Ralph E. Lawrence, Wickliffe, Ohio, assignor to The Grasselli Chemical Company, Cleveland, Ohio, a corporation of Delaware No Drawing. Application August 17, 1933, Serial No. 685,652

21 Claims. (Cl. 148—8.1)

The present invention relates to corrosion inhibitors which are soluble in water and dilute acid solutions, as used in the pickling and cleaning of metallic articles and consists in the reaction products of sulphurized cinchona bark alkaloids, particularly sulphurized quinoidine with organic carboxylic acids.

The use of sulphurized quinoidine as a corrosion inhibitor is disclosed in U. S. Patent 1,867,414, dated July 12, 1932, and U. S. Patent 1,908,773 of May 16, 1933.

I have found that the sulphurized cinchona bark alkaloids disclosed in these patents are capable of reacting with organic carboxylic acids to form new compounds which are characterized by solubility in water, dilute and concentrated acids; they furthermore retain their valuable properties of inhibiting the action of acids upon metals. Their solutions in the carboxylic acids and in concentrated sulphuric or hydrochloric acids form a convenient form of incorporating the novel compounds into pickling and acid cleaning solutions.

The chemical evidence available makes me believe that the new compounds are not merely salts of the sulphurized cinchona alkaloids or of sulphurized quinoidine and the carboxylic acids, such as obtained for instance, when dissolving sulphurized quinoidine in dilute formic or acetic acid, but that a more profound chemical change takes place when acting with concentrated carboxylic acids upon the sulphurized alkaloids. It is, of course, difficult to ascertain the nature of such chemical reaction, the sulphurized cinchona bark alkaloids are of non-crystallizing nature, being more of a resinous type, without definite melting point, and the sulphur therein is not combined in stoichiometric proportions.

In appearance the sulphurized cinchona bark alkaloids are quite similar to their carboxylic acid derivatives, though there are differences in their physical behavior.

When the carboxylic acid derivatives are dissolved in mineral acid, and the acid then neutralized, my new compounds are in some instances precipitated in a tarry form, and in other instances by evaporation to dryness of the compounds which are entirely soluble in the neutralization liquor. The recovered products have been found to be more soluble in water, dilute and concentrated acids and to have a lower melting or softening point than the original sulphurized products from which the carboxylic acid derivatives were produced.

For lack of a better descriptive term, I choose to call my new compounds carboxylic acid derivatives of sulphurized cinchona bark alkaloids.

Another evidence of chemical reaction is seen in the fact that in general the solubility in water of the carboxylic acid derivatives increases with increasing amounts of the carboxylic acids allowed to react upon the sulphurized cinchona bark alkaloids.

A large number of carboxylic acids have been combined with sulphurized cinchona bark alkaloids and it was found that those carboxylic acids which are soluble in dilute, for instance 5% sulphuric acid, are particularly adapted to produce novel reaction products which are of value as corrosion inhibitors. As the constitution of the sulphurized alkaloids is still unknown no stoichiometric proportions can be given in which to react the carboxylic acid with the sulphurized alkaloids. In general, amounts of carboxylic acid corresponding to ½ to twice the weight of the sulphurized alkaloid can be combined with the sulphurized alkaloid. In some instances there will be incomplete reaction, in other cases there might remain an excess of carboxylic acid in the finished product. In neither instance is this detrimental to the use of the reaction products as corrosion inhibitors. In cases where the carboxylic acid is insoluble in dilute sulphuric acid, such as when reacting sulphurized quinoidine with higher fatty acids, such as oleic, linoleic or stearic, in which it is soluble, an excess of the acid is to be avoided, as it would separate from the acid cleaning bath to which the products could be added.

The reaction between the sulphurized cinchona bark alkaloid and the carboxylic acid is slightly exothermic and the reaction is effected by mixing the two ingredients and if necessary slightly heating to melt the products. In the case of carboxylic acids which are liquid at ordinary temperature, such as formic, acetic or butyric acid, I simply dissolve the sulphurized alkaloid in the concentrated acid, such as for instance 90% formic acid, glacial acetic acid or commercial butyric acid. The temperature of the mixture increases with formation of the carboxylic acid derivative. With carboxylic acids solid at ordinary temperatures I mix the two components and heat them to melting temperature, or prepare a concentrated, or saturated solution of the carboxylic acid in any convenient solvent, suspend the sulphurized alkaloid therein and heat until formation of the carboxylic derivative takes place. The solvent is then conveniently evaporated, or the reaction product is dissolved in strong sulphuric acid, which means from about 56 to 66° Bé. acid and the product is ready for use as a pickling or corrosion inhibitor. In other instances I can also neutralize the excess carboxylic acid with caustic alkali where, particularly in the case of the formic acid derivative of sulphurized quinoidine, a tarry matter is precipitated which has a good solubility in acid pickling solutions and has high inhibiting properties.

I have also found that the carboxylic acid in this reaction can be replaced by their corresponding anhydrids and with acetic or phthalic anhydrid products have been obtained which are entirely similar to the products obtained with acetic or phthalic acids.

Reaction products of sulphurized quinoidine with various organic carboxylic acids were prepared from equal weights of the carboxylic acid and the sulphurized quinoidine in the manners above described and some of the products are described in the table below:

| Carboxylic acid | Solubility in 5% sulphuric acid | Nature of the product |
| --- | --- | --- |
| Formic | Yes | Liquid. |
| Acetic | Yes | Liquid. |
| Citric | Yes | Solid. |
| Tartaric | Yes | Solid. |
| Butyric | Yes | Liquid. |
| Chloroacetic | Yes | Semi-liquid. |
| Pyroligneous | Yes | Liquid. |
| Lactic | Yes | Semi-liquid. |
| Oxalic | Yes | Solid. |
| Succinic | Yes | Solid. |
| Maleic | Yes | Liquid. |
| Acetic anhydrid | Yes | Liquid. |
| Oleic | Soluble with separation of excess acid. | Liquid. |
| Linoleic | Soluble with separation of excess acid. | Liquid. |
| Stearic | Soluble with separation of excess acid. | Solid. |

The inhibiting efficiency of the various reaction products was tested in each instance and found to be of the same order as that of sulphurized quinoidine.

Whereas sulphurized quinoidine is entirely insoluble in hot water the above reaction products, with the exception of that prepared from formic acid, and particularly those prepared from oxalic, tartaric, citric, chloroacetic or lactic acid are greatly soluble in hot water.

The pickling efficiency of some of the carboxylic acid derivatives of sulphurized quinoidine are given in the table below:

The derivatives were prepared by dissolving 20 parts sulphurized quinoidine in 20 parts of the carboxylic acid, or its saturated aqueous solution and evaporating the aqueous solution to dryness. The product was then dissolved in 60 parts by weight of 60° Bé. sulphuric acid and added in an amount of 0.025% to a 5% sulphuric acid solution. The efficiency was determined by the standard loss of weight method upon scale free low carbon sheet steel.

| Derivative of sulphurized quinoidine with— | Inhibiting efficiency in a 60-minute period |
| --- | --- |
| | Per cent |
| Butyric acid | 98.3 |
| Oxalic acid | 94.8 |
| Chloroacetic acid | 96.5 |
| Lactic acid | 98.2 |
| Citric acid | 97.4 |
| Formic acid | 97.6 |

In other instances the carboxylic acid derivatives were precipitated with alkali from their reaction mixture, dried and used as inhibitors. The following efficiency figures were obtained when dissolving 0.01% of the derivatives in 5% sulphuric acid, and using this solution on scale free low carbon sheet steel:

| Derivative | First 60 minute period | Second 60 minute period |
| --- | --- | --- |
| | Per cent | Per cent |
| Formic acid derivative of sulphurized quinoidine | 96.6 | 94.6 |
| Oxalic acid derivative of sulphurized quinoidine | 96.1 | 93.0 |

I claim:

1. The process of producing a corrosion inhibitor which comprises reacting in the liquid phase with a concentrated carboxylic acid upon a sulphurized cinchona bark alkaloid.

2. The process of producing a corrosion inhibitor which comprises reacting in the liquid phase with a concentrated carboxylic acid upon sulphurized quinoidine.

3. The process of producing a corrosion inhibitor which comprises dissolving sulphurized quinoidine in concentrated formic acid, allowing the temperature of the reaction mixture to increase and dissolving the liquid reaction product in strong sulphuric acid.

4. The process of producing a corrosion inhibitor which comprises dissolving sulphurized quinoidine in an about equal weight of concentrated formic acid, allowing the temperature of the reaction mixture to increase and dissolving the liquid reaction product in strong sulphuric acid.

5. The process of producing a corrosion inhibitor which comprises reacting in the liquid phase with a concentrated aliphatic carboxylic acid upon a sulphurized cinchona bark alkaloid.

6. The process of producing a corrosion inhibitor which comprises reacting in the liquid phase with a concentrated aliphatic acid upon sulphurized quinoidine.

7. As a corrosion inhibitor the product obtained by reacting in the liquid phase with a concentrated carboxylic acid upon a sulphurized cinchona bark alkaloid, said product being further characterized by easy solubility in dilute sulphuric acid.

8. As a corrosion inhibitor the product obtained by reacting in the liquid phase with a concentrated aliphatic carboxylic acid upon a sulphurized cinchona bark alkaloid, said product being further characterized by easy solubility in dilute sulphuric acid.

9. As a corrosion inhibitor the product obtained by reacting in the liquid phase with a concentrated carboxylic acid upon sulphurized quinoidine, said product being further characterized by easy solubility in dilute sulphuric acid.

10. As a corrosion inhibitor the product obtained by reacting in the liquid phase with a concentrated aliphatic carboxylic acid upon sulphurized quinoidine, said product being further characterized by easy solubility in dilute sulphuric acid.

11. As a corrosion inhibitor the product obtained by reacting with concentrated formic acid at elevated temperature upon sulphurized quinoidine, said product being further characterized by being difficultly soluble in water and soluble in dilute sulphuric acid.

12. A pickling and cleaning bath for metals comprising sulphuric acid and the corrosion inhibitor of claim 7.

13. A pickling and cleaning bath for metals comprising sulphuric acid and the corrosion inhibitor of claim 8.

14. A pickling and cleaning bath for metals comprising sulphuric acid and the corrosion inhibitor of claim 9.

15. A pickling and cleaning bath for metals comprising sulphuric acid and the corrosion inhibitor of claim 10.

16. A pickling and cleaning bath for metals comprising sulphuric acid and the corrosion inhibitor of claim 11.

17. In a process of pickling and cleaning a metal article, the step comprising treating said article with an acid cleaning solution containing the corrosion inhibitor of claim 7.

18. In a process of pickling and cleaning a metal article, the step comprising treating said article with an acid cleaning solution containing the corrosion inhibitor of claim 8.

19. In a process of pickling and cleaning a metal article, the step comprising treating said article with an acid cleaning solution containing the corrosion inhibitor of claim 9.

20. In a process of pickling and cleaning a metal article, the step comprising treating said article with an acid cleaning solution containing the corrosion inhibitor of claim 10.

21. In a process of pickling and cleaning a metal article, the step comprising treating said article with an acid cleaning solution containing the corrosion inhibitor of claim 11.

RALPH E. LAWRENCE.